(12) United States Patent
Amitai et al.

(10) Patent No.: US 6,580,529 B1
(45) Date of Patent: Jun. 17, 2003

(54) HOLOGRAPHIC OPTICAL DEVICES

(75) Inventors: Yaakov Amitai, Rehovot (IL); Asher Friesem, Rehovot (IL)

(73) Assignees: Elop Electro -Optics Industries Ltd., Rehovot (IL); Yeda Research and Development Co. Ltd., Rehovot (IL)

( * ) Notice: Subject to any disclaimer, the term of this patent is extended or adjusted under 35 U.S.C. 154(b) by 0 days.

(21) Appl. No.: 09/647,520

(22) PCT Filed: Mar. 29, 1999

(86) PCT No.: PCT/IL99/00183

§ 371 (c)(1),
(2), (4) Date: Dec. 15, 2000

(87) PCT Pub. No.: WO99/52002

PCT Pub. Date: Oct. 14, 1999

(30) Foreign Application Priority Data

Apr. 2, 1998 (IL) .................................................. 123936

(51) Int. Cl.[7] .............................. G02B 5/32; G03H 1/00; G03H 1/22
(52) U.S. Cl. ............................. 359/13; 359/15; 359/19; 359/32; 359/34
(58) Field of Search ............................. 359/13, 14, 15, 359/16, 19, 33, 34, 25, 32, 9; 385/37, 129

(56) References Cited

U.S. PATENT DOCUMENTS

| 4,711,512 A | * 12/1987 | Upatnieks ...................... 345/7 |
| 4,866,694 A | 9/1989 | Korth |
| 4,946,253 A | * 8/1990 | Kostuck ...................... 359/15 |
| 5,224,198 A | * 6/1993 | Jachimowicz et al. ...... 385/133 |
| 5,455,693 A | * 10/1995 | Wreede et al. ................ 359/15 |
| 5,500,910 A | * 3/1996 | Boudreau et al. ............. 385/24 |
| 5,724,163 A | * 3/1998 | David .......................... 359/15 |
| 5,745,266 A | * 4/1998 | Smith .......................... 359/34 |
| 5,966,223 A | * 10/1999 | Friesem et al. ............... 359/16 |

FOREIGN PATENT DOCUMENTS

EP  0609812 A1  8/1994

OTHER PUBLICATIONS

European Search Report, 999120363–2217, Jun. 4, 2002, pp. 1–4.

* cited by examiner

Primary Examiner—John Juba, Jr.
(74) Attorney, Agent, or Firm—Connolly Bove Lodge & Hutz LLP

(57) ABSTRACT

The invention provides a holographic optical device, including a light-transmissive substrate; a first holographic optical element carried by the substrate; at least one second holographic optical element carried by the substrate laterally of the first holographic optical element, and at least one third holographic optical element carried by the substrate laterally displaced from the first and second holographic optical elements; wherein the center of at least one of the first, second or third holographic optical elements is located outside a single, straight line.

10 Claims, 3 Drawing Sheets

HOLOGRAPHIC OPTICAL DEVICES

TECHNICAL FIELD

The present invention relates to holographic optical devices, and particularly to devices which include a plurality of holographic optical elements (HOEs) carried by a common light-transmissive substrate.

BACKGROUND ART

One of the important applications for HOEs is in visor displays, in which a HOE serves as an imaging lens and a combiner where a two-dimensional, quasi-monochromatic display is imaged to infinity and reflected into the eye of an observer. The display can be obtained directly, either from a cathode ray tube (CRT) or a liquid crystal display (LCD); or indirectly, by means of a relay lens or an optical fiber bundle. Typically, the display is comprised of an array of points, the geometry of which differs from that used for recording the HOE. As a result, the imaged array contains aberrations that decrease the image quality. Usually, the amount of aberrations increases as the offset angle for recording the HOE becomes larger. Another problem, which is usually common to all types of holographic optical elements, is their relatively high chromatic dispersion. This is a major drawback in applications where the light source is a CRT which is not purely monochromatic.

Recently, several new designs were proposed for improving the performance of HOES. These designs, which usually deal with single HOEs, compensate for the geometric and chromatic aberrations by using non spherical waves rather than simple spherical waves for recording however, they do not overcome the chromatic dispersion problem. Moreover, with these designs, the overall optical systems which include these HOEs are usually very complicated and difficult to manufacture. Furthermore, the eye-motion-box of the optical viewing angles resulting from these designs is usually very small typically less than 10 mm. Hence, the performance of the optical system is very sensitive, even to small movements of the visor relative to the eye of the viewer.

DISCLOSURE OF THE INVENTION

The present invention may be used for designing and recording HOEs for visor displays in which both the aberrations and chromatic dispersions are minimized. In addition, the eye-motion-box of the optical system is relatively large and can therefore accommodate large movements of the visor. The HOE of the invention is particularly advantageous because it is very compact and can be readily incorporated even into optical systems that have specialized configurations.

The present invention also enables the construction of improved holographic displays. Since its inception three decades ago, there has been significant progress in the area of display holography. Indeed, it has become so popular that it now plays an important role in advertising, packaging and even in art. Yet, the current form of display holograms has some severe drawbacks the necessity to use a readout light source that must be located at some distance from the hologram, in order to illuminate its entire surface, makes holographic display systems bulky, space-consuming and sometimes inconvenient to use. Another drawback is that the transmitted part of the readout wave which is not diffracted by the holograms usually bothers the observer.

Another important application of the present invention is in providing a compact holographic display which overcomes the above drawbacks. The holographic display of the invention can be illuminated with a compact light source which is attached to the holographic substrate, normal to the smallest HOE recorded on the substrate. The chromatic dispersion of this display is relatively small and the light source can have a wide spectrum, even like a conventional white-light source. In addition, the area of the display can be much larger than the area which is actually illuminated by the light source.

A further application of the invention provides a compact beam expander. Beam expanders for magnifying a narrow, collimated beam into a beam of larger diameter typically comprise a telescopic assembly of two lenses along a common axis with a common focal point when used with polychromatic light, e.g., white light, refractive lenses are generally needed. However, with monochromatic light, such as from lasers or other monochromatic light sources, it may be advantageous to exploit holographic lenses. The present invention provides a beam expander which can be used with monochromatic light as well as with polychromatic light.

It is therefore a broad object of the present invention to provide compact holographic optical devices in which the readout light source must not be located at some distance from the hologram in order to illuminate the entire surface, and the light source can be constituted by a white-light source.

Therefore, according to the present invention there is provided a holographic optical device comprising a light-transmissive substrate; a first holographic optical element carried by said substrate; at least one second holographic optical element carried by said substrate laterally of said first holographic optical element, and at least one third holographic optical element carried by said substrate laterally displaced from said first and second holographic optical elements; characterized in that the center of at least one of said first, second or third holographic optical elements is located outside a single, straight line, and wherein the lateral dimensions of the area of display of said third holographic optical element are larger than the lateral dimensions of the area of display of said first holographic optical element.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a diagram explaining the novel system of the present invention, showing a top view thereof;

FIG. 2 is a curve illustrating the intensity of the output waves, the diffraction efficiency of the hologram, and the amount of energy left in the hologram as a function of the propagation distance inside the hologram along the axis;

Figure 3:
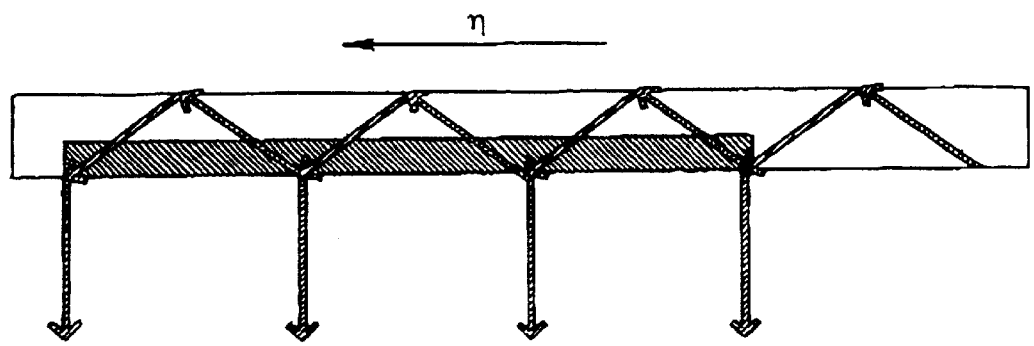
Figure 4:
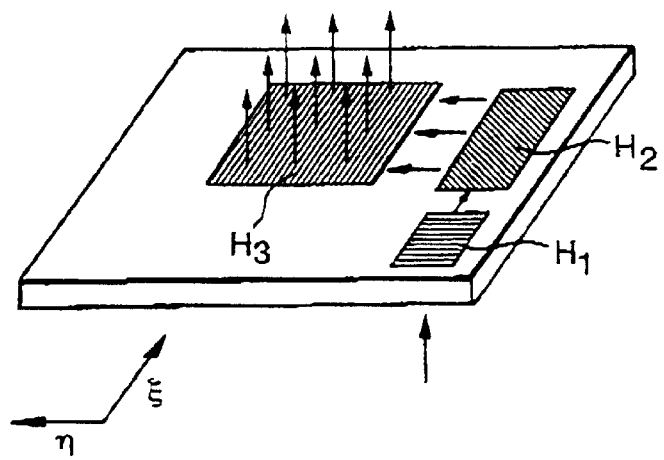
Figure 5:
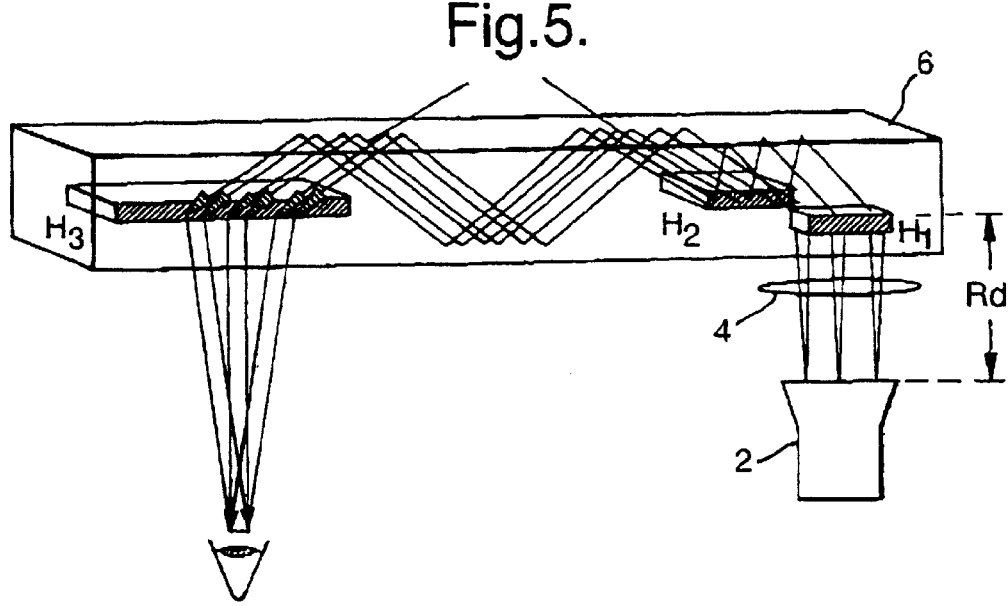
Figure 6:
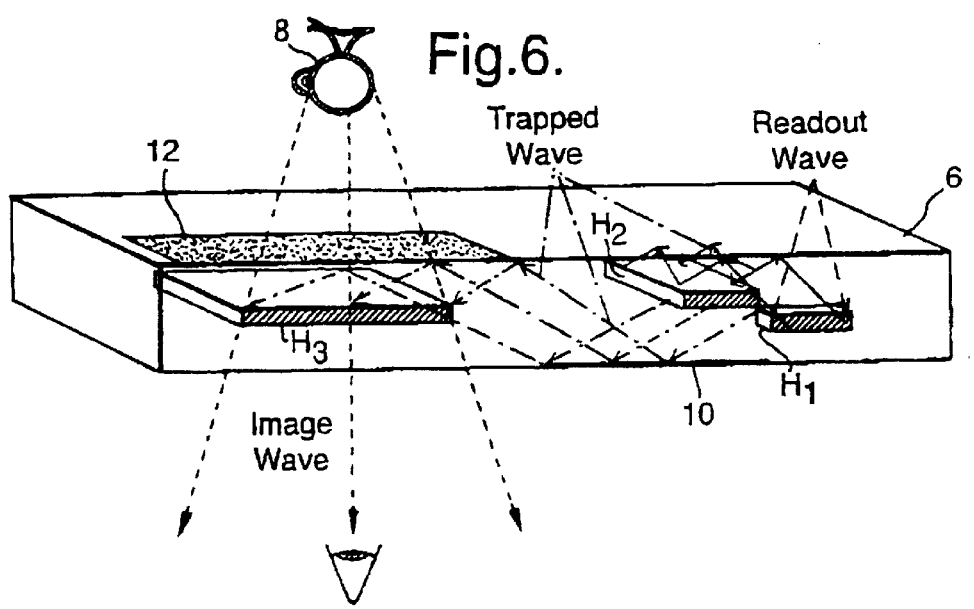
Figure 7:
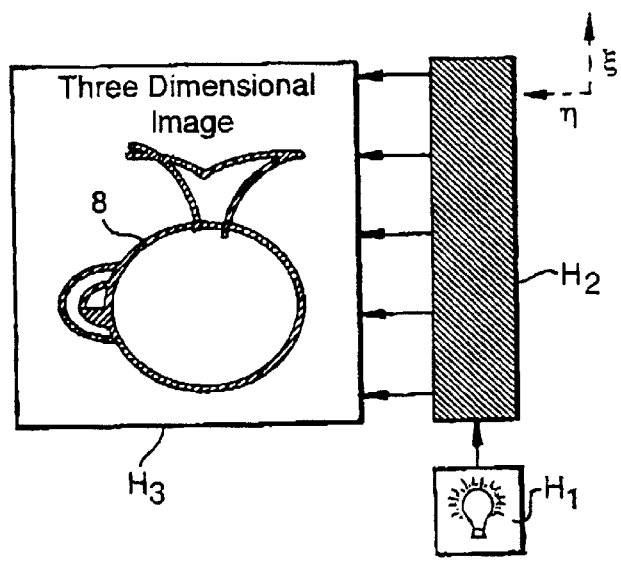
Figure 8:
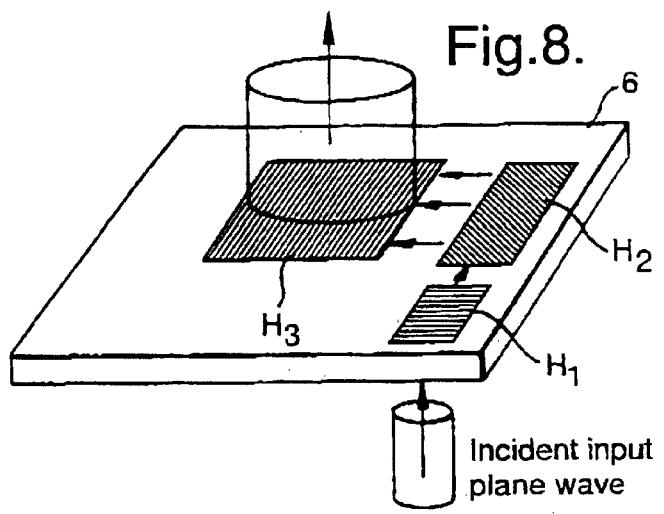

FIG. 3 diagrammatically illustrates the schematic behavior of the optical wave along the propagation axis;

FIG. 4 is a three-dimensional view, diagrammatically illustrating the planar system, in which the diffracted wave is expanded first along the, axis and then along the η axis;

FIG. 5 is a side view, diagrammatically illustrating a holographic visor display based on a planar configuration;

FIG. 6 is a side view, diagrammatically illustrating a three-dimensional holographic display based on planar optics;

FIG. 7 is a top view, diagrammatically illustrating a three-dimensional holographic display based on planar optics, and FIG. 8 is a top view, diagrammatically illustrating a compact beam expander based on planar optics.

DETAILED DESCRIPTION

Figure 1:
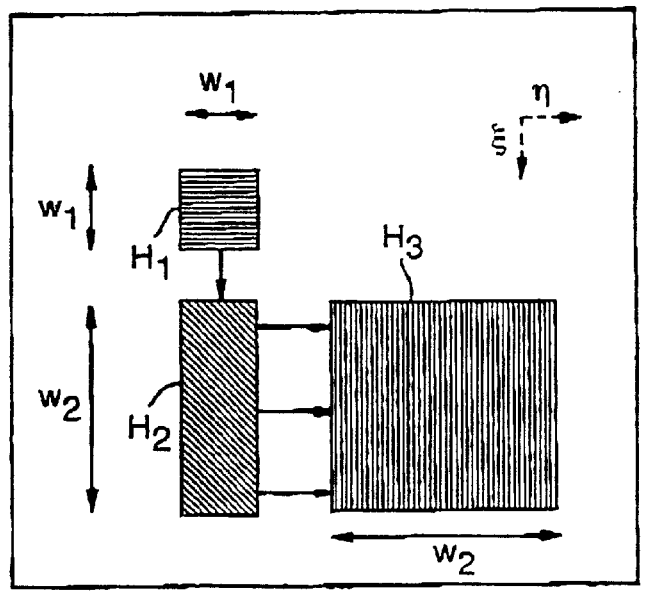

Referring now to the drawings, FIG. 1 illustrates a top view of the planar optical configuration of the invention. The first HOE $H_1$ is illuminated by a light source (not shown) which is located behind the element. HOE $H_1$ collimates the incident light from the source if the light is not already collimated, and diffracts it such that the light is trapped inside the substrate thereof by total intern reflection. Assuming that the central wave of the source is normally incident onto $H_1$, the off-axis angle of the diffracted wave inside the substrate is α, and the projection of the diffracted wave on the substrate surface is along the ξ axis, then the grating function of $H_1$ is $$\Phi_1 = -\frac{2\pi}{\lambda}[\nu\sin\alpha]\xi \quad (1)$$

wherein:
ν is the refractive index of the substrate, and
λ A is the wavelength of the diffracted wave.
The HOE $H_1$ has a high diffraction efficiency, so that most of the energy of the incoming wave is coupled into the substrate.

Figure 2:
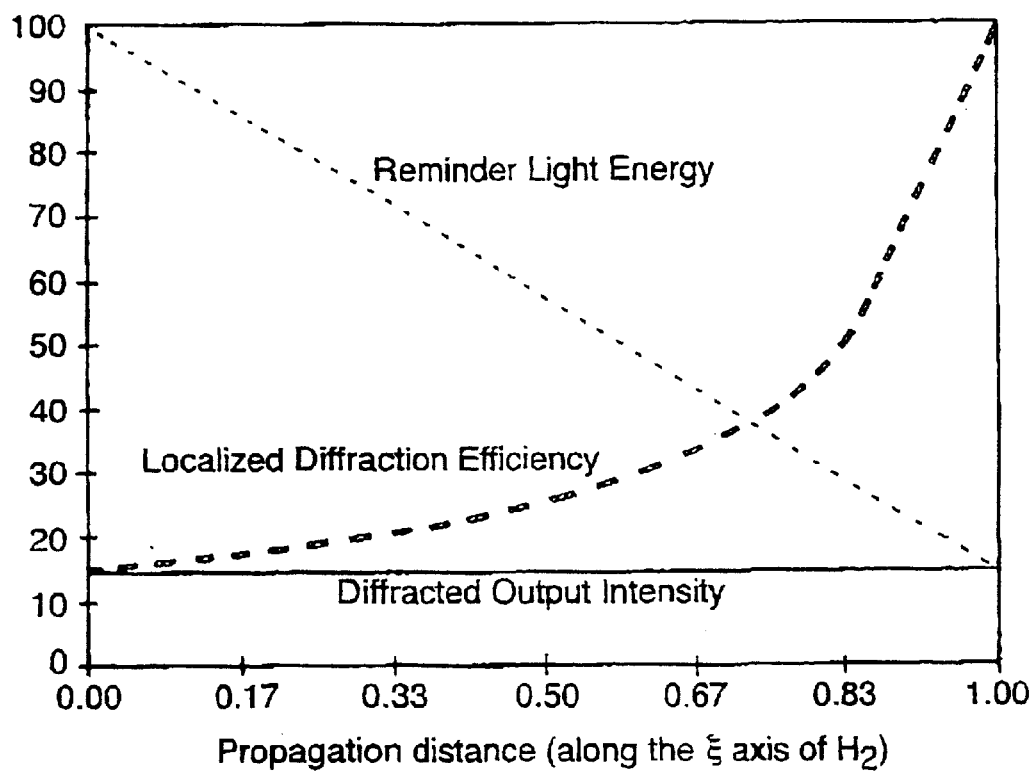

After a few reflections inside the substrate, the trapped waves reach a second HOE $H_2$, having the following characteristics: along the axis η, which is normal to the propagation direction axis ξ, $H_2$ has the same lateral dimension $W_1$ as $H_1$; along the ξ axis, $H_2$ has a lateral dimension $W_2$ which is substantially larger than $W_1$, while t he exact ratio between the two dimensions is determined according to the desired magnification of the system. The diffraction efficiency of $H_2$ is not a constant, but increases gradually along the ξ axis such that during each contact with $H_2$, only part of the energy of the trapped optical waves is diffracted by $H_2$. As shown in FIG. 2, the HOE $H_2$ must be embodied in the substrate so that its localized diffraction efficiency will increase non-linearly with propagation distance and result in an uniform intensity of the output beam. The central wave from $H_2$ is still oriented at the angle α, but the propagation direction of the wave is changed to be along the η axis. Hence, the grating function of $H_2$ is $$\Phi_2 = \frac{2\pi}{\lambda}[m\xi + m\eta] = \frac{2\pi}{\lambda}\sqrt{2}\,m\left[\frac{\sqrt{2}}{2}\xi + \frac{\sqrt{2}}{2}\eta\right] \quad (2)$$

$$\frac{2\pi}{\lambda}\frac{\sqrt{2}}{2}m\left[\frac{\sqrt{2}}{2}\xi + \frac{\sqrt{2}}{2}\eta\right] + \frac{2\pi}{\lambda}\frac{\sqrt{2}}{2}m\left[\frac{\sqrt{2}}{2}\xi + \frac{\sqrt{2}}{2}\eta\right] = \phi_o^2 - \phi_r^2$$

wherein:
m≡ν sin α.
The grating function of Equation 2 can be achieved by recording the interference pattern of two interfering plane waves that are oriented at angles of ±α' with respect to the normal to the recording medium, where sin $$\sin\alpha' = \frac{\sqrt{2}}{2}\sin\alpha,$$

and the projection of the recording waves on the substrate is along the bisector of the angle between axes ξ and η. The purpose of HOE $H_2$ is to increase the diameter of the incoming plane waves by a factor of $$\frac{W_2}{W_1}$$

along the ξ axis.

The optical waves diffracted from $H_2$ are trapped in the substrate and propagate toward a third HOE $H_3$, which couples the trapped waves outward from the substrate. HOE $H_3$ has lateral dimensions (active area) of $W_2$ in both axes. Similar to the second HOE $H_2$, the diffraction efficiency of $H_3$ also changes gradually, but along the η axis. FIG. 3 schematically illustrates how an output wave with a uniform intensity is distributed along HOE $H_3$. $H_3$ diffracts the trapped waves to a direction normal to the substrate plane. In the particular example give in FIG. 3, the light energy of the incoming wave is reduced gradually while the intensity of the output wave is kept constant over the entire area of HOE $H_3$. In other applications, however, the diffraction efficiency of HOE $H_3$ might be varied locally, in order to achieve output waves with other predefined intensities to necessarily constant. The grating function of HOE $H_3$ is $$\Phi_3 = -\frac{2\pi}{\lambda}[\nu\sin\alpha]\eta$$

Similarly to $H_2$, HOE $H_3$ also increases the diameter of the incoming waves by a factor of $$\frac{W_2}{W_1}$$

along the η axis only. Thus, the combination of the three HOEs increases the diameter of the incident input plane waves by a factor of $$\frac{W_2}{W_1}$$

in both axes.

Combining Equations 1–3 yields;

$$\Phi_1\Phi_2+\Phi_3=0 \quad (4)$$

Equation 4 is valid for all wavelengths. Hence, the overall planar configuraton will result in no chromatic dispersion, and it is thus appropriate for polychromatic light sources.

FIG. 4 presents a three-dimensional view of the overall optical planar configuration. As shown, the output waves emerge in the same direction as the incoming waves. However, it is also possible to record HOE $H_3$ so that the output waves will emerge in the opposite direction to that of the incoming waves.

As mentioned hereinbefore, one important application of the invention is the utilization of the device as a holographic visor display. In such an application, the first HOE collimates the waves from each data point in a display into plane waves if they are not already collimated, and diffracts them at such an angle that they will be trapped inside the substrate by total internal reflection. The second HOE expands the diameter of the trapped waves in one dimension, and the third HOE expands the diameter of the trapped waves in another dimension and diffracts the expanded plane waves toward the eye of an observer.

In further described applications of the invention, the first HOE is constructed to transform an input beam of light into a diverging spherical wave at a high, off-axis angle such that the wave propagates by total internal reflection towards the second HOE and is then diffracted to a different direction toward the third HOE. It is then diffracted by means of the third HOE to emerge from the substrate. In one such application, the third HOE is a display hologram that is read by the light arriving from the second HOE, so as to form a three-dimensional image.

According to an additional application of the invention, the three HOEs may be recorded so that the lateral dimensions of the output light beam emerging from the third HOE are substantially larger than the lateral dimensions of the input light beam entering the first HOE, thus providing a beam expander which can be used with both monochromatic and polyaromatic light FIG. 5 illustrates a compact, holographic visor display configuration constructed in accordance with the present invention. The illustrated configuration is composed of three HOEs, the smallest of which is $H_1$, onto which the light from the input display 2 is incident $H_1$ couples the light from the input display, optionally via a collimating lens 4, into a substrate 6, e.g., a glass substrate, and expands the light distribution in one direction. The second HOE $H_2$ expands the light distribution in the other direction, and the third HOE $H_3$ then couples the light from the substrate 6 outwards.

The two-dimensional input display 2 is located at a distance $R_d$ from the center of $H_1$, where $R_d$ is the focal length of $H_1$. The light from the display 2 is thus transformed into an angular spectrum of plane wavefronts, either by $H_1$, where the grating function of $H_1$ is the one defined above in Equation 1, plus the function of a corrected collimating lens, or by the external collimating lens 4, which is located between the display 2 and $H_1$, where $H_1$ is a linear grating as defined in Equation 1. Light from each point at the display diverges, is collimated to form a plane wave and is diffracted at an angle $\alpha(\xi)$ inside the substrate, where $\xi$ is the lateral coordinate of $H_1$. To ensure that all the diffracted waves will be trapped inside the substrate by total internal reflection, $\alpha(\xi)$ must satisfy the relationship $$\nu \geq \sin\alpha(\xi) \geq 1 \qquad (5)$$

wherein:

$\nu$ is the refractive index of the substrate.

The HOE $H_2$ diffracts the trapped wavefronts toward the third HOE $H_3$. The wavefronts serves as the readout waves for $H_2$ and are oriented at angles $\alpha(\eta)$. HOE $H_3$ diffracts the trapped wavefronts outward to an observer located at a distance $R_{eye}$, who thus sees an image of the input display at infinity.

The advantages of the above-described planar holographic visor display configuration as are follows:

1) Since the input display source can be located very close to the substrate, the overall configuration can be very compact and of little weight.
2) Unlike other visor display configurations, here there is much flexibility with regard to where to put the input display source relative to the final eyepiece. Hence, the regular off-axis configuration is avoided and field aberrations can be compensated relatively easily and efficiently.
3) Since the overall operation of the planar configuration retains the original directions of the incoming waves at the output, the chromatic dispersion is practically zero, or nearly zero, if the collimation is performed by the first hologram, so that a polychromatic light source might be used as the display source.
4) Since each point from the input display is transformed into a plane wave that is diffracted into the eye of the viewer from the entire area of $H_3$, the tolerances on the exact location of the eye can be significantly relaxed. Thus, the viewer can see the entire field of view and the eye-motion box can be significantly larger than in other visor display configurations.

FIGS. 6 and 7 illustrate a compact, holographic, three-dimensional display configuration constructed according to the present invention. The illustrated configuration is composed of a light source and HOE $H_1$ for collimating and diffracting the waves from the light source so they will be trapped inside the substrate 6 and propagate toward HOE $H_2$, which directs the waves from $H_1$ toward display hologram $H_3$, on which is holographically recorded an image of a three-dimensional object 8. Alternatively, $H_3$ could be an HOE that diffracts light outwards to serve as the readout light for a hologram located adjacent to $H_3$. The readout wave from the input light source can be either a spherical wave or a plane wave normal to HOE $H_1$. The readout wave for $H_3$ is a plane wave with a larger diameter than the plane wave emerging from $H_1$, oriented at an angle $\alpha$. The third hologram $H_3$ couples the image waves outward so as to form a virtual image of a three-dimensional object. In order to avoid extraneous light from the zero order or from undesired reflections, parts of the surfaces should be covered with opaque layers 10, 12. While the grating functions of the HOEs $H_1$ and $H_2$ are those of simple gratings as defined in Equations 1 and 2 above, the grating function of $H_3$ is a complicated one, defined as $$\Phi_3^{dis} = \Phi_3 + \phi_{dis} \qquad (6)$$

wherein:

$\Phi_3$ is defined in Equation 3, and $\phi_{dis}$ is the phase of the three-dimensional object which is recorded in $H_3$.

Clearly, this holographic three-dimensional display configuration is much more compact than those used for regularly viewing holograms. Specifically, a compact light source can be located adjacent to $H_1$, and hence, there is no need for a readout light source which must normally be located at some distance from the hologram in order to illuminate its entire surface, and the extraneous light from the zero order which usually bothers the observer can be blocked with opaque layers. Moreover, since the chromatic dispersion of this planar display configuration is relatively small, the light source can have a wide spectrum such as from a conventional white light source, and there is no need to reconstruct laser light.

FIG. 8 illustrates a compact, holographic beam expander configuration constructed in accordance with the present invention. The illustrated configuration is composed of an input HOE $H_1$, an intermediate HOE $H_2$ and an output HOE $H_3$. The input incident wave for the first HOE $H_1$ is a plane wave normally incident onto the substrate, while the output wave is a plane wave having a significantly larger diameter than that of the input wave. The operation of this planar beam-expanding configuration is similar to that described above for the two other configurations.

The holographic optical elements can be recorded in the substrate as an interference pattern of two mutually coherent optical waves by means of computer-generated masks and lithographic techniques, or by direct writing techniques.

It will be evident to those skilled in the art that the invention is not limited to the details of the foregoing illustrated embodiments and that the present invention may be embodied in other specific forms without departing from the spit or essential attributes thereof the present embodiments are therefore to be considered in all respects as illustrative and not restrictive, the scope of the invention being indicated by the appended claims rather than by the foregoing description, and all changes which come wit the meaning and range of equivalency of the claims are therefore intended to be embraced therein.

What is claimed is:

1. A holographic optical device, comprising:

a light-transmissive substrate having two opposite major surfaces parallel to the major plane of the substrate;

a first holographic optical element having a first area carried by said substrate for coupling optical waves from a light source and propagating them inside said substrate by total internal reflection;

at least one second holographic optical element having a second area carried by said substrate and being laterally displaced along the major plane of the substrate, from said first holographic optical element for changing the projection on substrate plane of the propagation directions of said optical waves, and at least one third holographic optical element having a third area carried by said substrate and being laterally displaced along the major plane of the substrate from said first and second holographic elements for coupling the optical waves out of said substrate;

wherein the projection of the grating vectors of said first, second and third holographic optical elements on the major surface of the substrate are oriented along three different directions, and wherein at least one of the lateral active areas of said third holographic optical element is larger than the lateral active area of said first holographic optical element.

2. The device according to claim 1, wherein at least one of said holographic optical elements is embodied in said substrate by recording said elements as an interference pattern of two mutually coherent optical waves.

3. The device according to claim 1, wherein at least one of said holographic optical elements is embodied in said substrate by means of computer-generated masks and lithographic techniques, or by direct writing techniques.

4. The device according to claim 1, wherein said first holographic optical element and said third holographic optical element are located on the same major surface of the substrate.

5. The device according to claim 1, wherein said first holographic optical element is located on one major surface of said substrate and said third holographic optical element is located on another major surface of said substrate.

6. The device according to claim 1, wherein said first holographic optical element has optical power utilizable as a collimating lens.

7. The device according to claim 1, wherein said first holographic optical elements diffracts trapped optical waves into a direction calculated to reach the eye of an observer.

8. The device according to claim 1, wherein said third holographic optical element is a display hologram illuminated by internally reflected light from said first and second holographic optical elements, so as to construct a three-dimensional image.

9. The device according to claim 1, wherein the diffraction efficiencies of said holographic optical elements vary locally for achieving output waves with uniform intensities.

10. The device according to claim 1, wherein the diffraction efficiencies of said holographic optical elements vary locally in order to achieve output waves with predefined intensities.

* * * * *